US011621660B2

(12) United States Patent
Caves et al.

(10) Patent No.: US 11,621,660 B2
(45) Date of Patent: Apr. 4, 2023

(54) METHOD FOR CONTROLLING AN ELECTRIC ROTARY MACHINE OPERATING AS A GENERATOR AND CORRESPONDING CONTROL SYSTEM FOR REDUCING THE VOLTAGE IN THE NETWORK IN THE EVENT OF A CUTOFF

(71) Applicant: Valeo Equipements Electriques Moteur, Creteil (FR)

(72) Inventors: Laurent Caves, Creteil (FR); Raphaël Filipe, Creteil (FR); Michaël Chemin, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 130 days.

(21) Appl. No.: 17/415,392

(22) PCT Filed: Dec. 20, 2019

(86) PCT No.: PCT/EP2019/086768
§ 371 (c)(1),
(2) Date: Jun. 17, 2021

(87) PCT Pub. No.: WO2020/128024
PCT Pub. Date: Jun. 25, 2020

(65) Prior Publication Data
US 2022/0045637 A1    Feb. 10, 2022

(30) Foreign Application Priority Data
Dec. 20, 2018 (FR) ..................... 1873609

(51) Int. Cl.
*H02P 23/00* (2016.01)
*H02P 9/10* (2006.01)
*H02P 101/45* (2016.01)

(52) U.S. Cl.
CPC .......... *H02P 9/102* (2013.01); *H02K 2213/09* (2013.01); *H02P 2101/45* (2015.01)

(58) Field of Classification Search
CPC .. H02P 23/0004; H02P 9/102; H02P 2101/45; G01R 31/52
See application file for complete search history.

(56) References Cited

U.S. PATENT DOCUMENTS

2011/0234130 A1* 9/2011 Okumura ............... G01R 31/52
                                            318/400.07
2014/0346988 A1* 11/2014 Toba ................... H02P 23/0004
                                            318/501

FOREIGN PATENT DOCUMENTS

DE    102014214639 A1    1/2016
DE    102016202169 A1    8/2016
(Continued)

OTHER PUBLICATIONS

Notification of Reasons for Refusal issued in Japanese Patent Application No. 2021-535629, dated Jul. 11, 2022 (15 pages).
(Continued)

*Primary Examiner* — Cortez M Cook
(74) *Attorney, Agent, or Firm* — Osha Bergman Watanabe & Burton LLP

(57) ABSTRACT

A method for controlling a multi-phase rotary electric machine is disclosed. The stator of the machine is controlled by a control bridge having a plurality of parallel mounted switching arms, with each arm comprising a high-side switch and a low-side switch connected at a center tap connected to a phase of said rotary electric machine. The machine operates as a generator and is connected to an electrical network on board a motor vehicle. The method involves short-circuiting a phase winding of the stator when a measurement of the voltage of said network exceeds a first predetermined value, and after this, activating a switching (Continued)

arm, the center tap of which is connected to said at least one short-circuited phase winding, during which the intensity in the short-circuited winding is measured, if the measured intensity is positive, the high-side switch of said activated switching arm is moved to the closed position, otherwise, it is moved to the open position.

9 Claims, 2 Drawing Sheets

(56) References Cited

FOREIGN PATENT DOCUMENTS

| FR | 2975241 A1 | 11/2012 |
|----|------------|---------|
| JP | 2002010694 A | 1/2002 |
| JP | 2003-244864 A | 8/2003 |
| JP | 2011-78216 A | 4/2011 |
| JP | 2014-513518 A | 5/2014 |

OTHER PUBLICATIONS

International Search Report and Written Opinion in corresponding International Application No. PCT/EP2019/086768, dated Apr. 20, 2020 (13 pages).

* cited by examiner

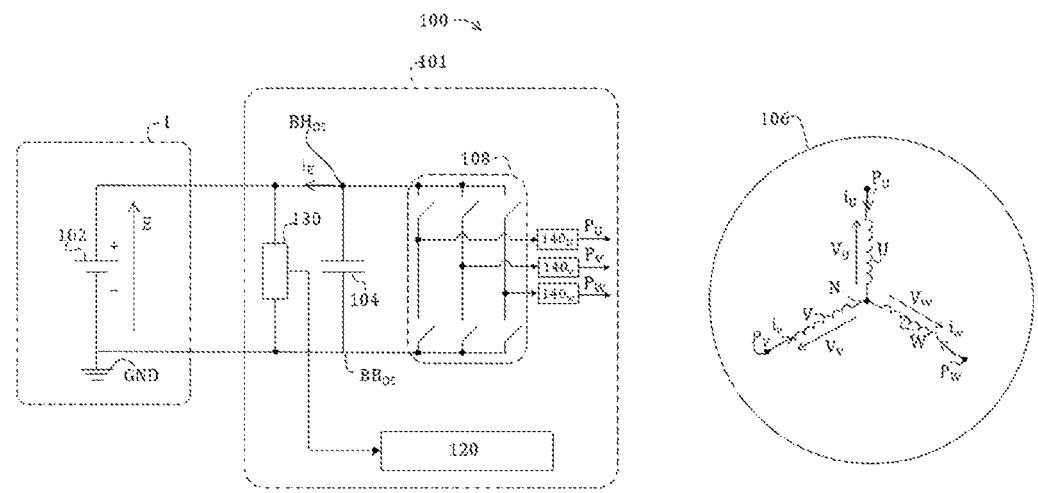
[Figure 1]
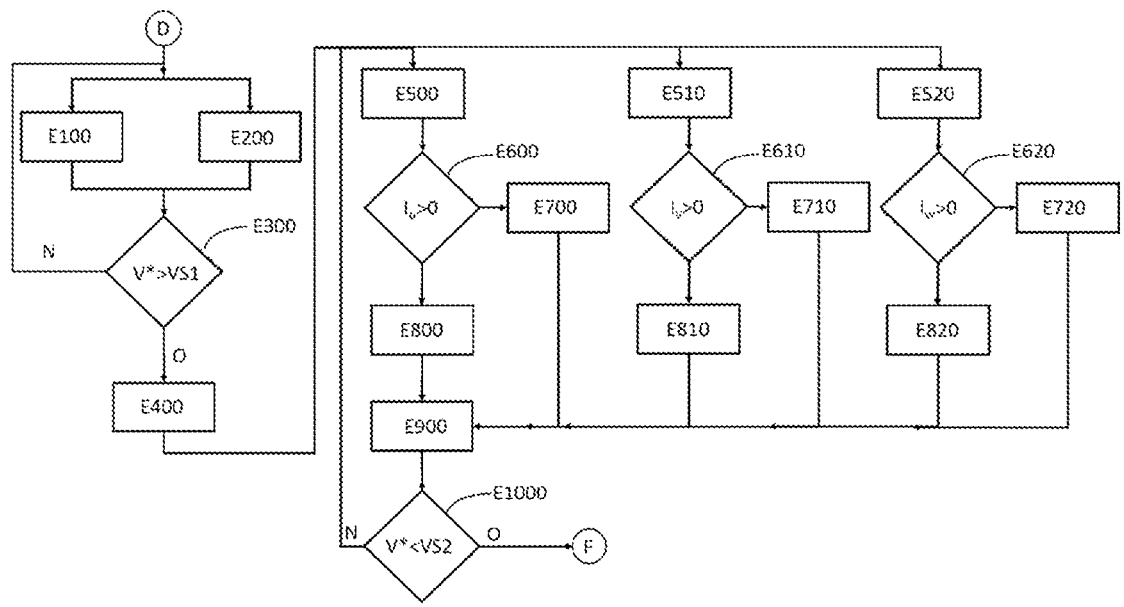
[Figure 2]

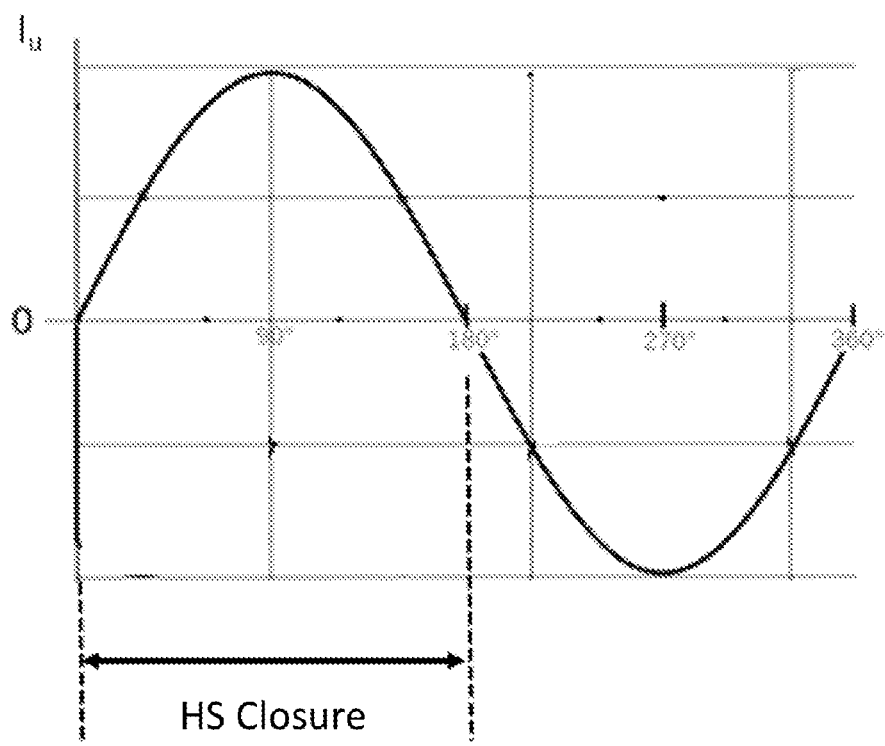
[Figure 3]

METHOD FOR CONTROLLING AN ELECTRIC ROTARY MACHINE OPERATING AS A GENERATOR AND CORRESPONDING CONTROL SYSTEM FOR REDUCING THE VOLTAGE IN THE NETWORK IN THE EVENT OF A CUTOFF

The present invention relates to a method for controlling a multi-phase rotary electric machine connected to an electrical network, in particular to a network on board a motor vehicle, in the event of a load dump, as well as to a control system suitable for implementing this method.

The invention also relates to an electrical system comprising this control system and a multi-phase rotary electric machine controlled by this control system.

In a motor vehicle, the on-board network is used to power the various items of electrical equipment fitted to the vehicle. The power is supplied by at least one battery. This is recharged by virtue of a rotary electric machine, based on the energy supplied by the rotation of the heat engine of the vehicle. A rotary electric machine is generally understood to be any multi-phase rotary electric machine used to produce direct output current supplying the on-board network. In particular, it can involve an alternator or even a starter-alternator.

In the event of a sudden disconnection of an electrical charge from the on-board network, from the battery or from both, a "load dump" phenomenon is created that results in overvoltage on the on-board network. Indeed, with the machine not instantaneously reacting to the load dump, it continues to deliver the same output current, while the current consumption on the on-board network has dropped. Consequently, all the capacitors connected to the on-board network charge and the direct voltage on the on-board network significantly increases.

Such overvoltage can damage or reduce the reliability not only of the rotary electric machine itself, but also of any electrical appliances connected to the on-board network.

Therefore, it is worthwhile detecting such high amplitude overvoltages and, if applicable, to safeguard the rotary electric machine.

To this end, a method for controlling a multi-phase rotary electric machine is known from the prior art, with said control method being of the type involving short-circuiting at least one phase winding of the stator in the event of a load dump, said method comprising a step of short-circuiting said at least one phase winding of the stator when the voltage of said network exceeds a first predetermined value.

This simple method of the prior art allows the voltage on the on-board network to be reduced by keeping at least one phase of the stator short-circuited while this voltage has not returned to an acceptable level.

However, a significant amount of time can elapse before the voltage on the on-board network returns to an acceptable level.

The aim of the invention is to at least partly overcome this disadvantage.

To this end, the invention relates to, according to a first aspect, a method for controlling a multi-phase rotary electric machine, the stator of which is controlled by a control bridge comprising a plurality of parallel mounted switching arms, with each arm comprising a high-side switch and a low-side switch connected together at a center tap, which is connected to a phase of said rotary electric machine, said rotary electric machine operating as a generator and being connected to an electrical network, in particular to a network on board a motor vehicle, said method comprising a step of short-circuiting at least one phase winding of the stator when a measurement of the voltage of said network exceeds a first predetermined value, said method being further characterized in that it comprises, following the short-circuiting step, a step of activating a switching arm, the center tap of which is connected to said at least one short-circuited phase winding, during which step:
1. the intensity in the short-circuited winding is measured;
2. if the measured intensity is positive, the high-side switch of said activated switching arm is moved to the closed position;
3. otherwise, the high-side switch of said activated switching arm is moved to the open position.

It should be noted that, within the meaning of the invention, the intensity is positive when the current flows in or returns to said at least one short-circuited winding from said center tap connected to said at least one short-circuited winding.

Thus, the control method according to the invention is of the type involving short-circuiting at least one phase winding of the stator in the event of a load dump.

The control method according to the invention can also have one or more of the following features, considered individually or according to all the technically possible combinations.

This method is noteworthy in that the control bridge of the stator is controlled when at least one phase winding of the stator is short-circuited, so as to introduce current originating from the on-board network into the phase winding of the previously short-circuited stator, in order to lower the voltage on the on-board network.

In a particular embodiment of the invention, if the measured intensity is positive, the low-side switch of said activated switching arm is moved to the open position.

In a particular embodiment of the invention, if the measured intensity is not positive, the low-side switch of said activated switching arm is moved to the closed position.

In a particular embodiment of the invention, during the step of short-circuiting at least one phase winding of the stator, the high-side switch of said activated switching arm is moved to the open position.

In a particular embodiment of the invention, during the step of short-circuiting at least one phase winding of the stator, the high-side switch of said activated switching arm is moved to the open position before the low-side switch of said activated switching arm is moved to the closed position.

In a particular embodiment of the invention, during the step of short-circuiting at least one phase winding of the stator, all the phase windings of said stator are short-circuited and all the high-side switches of all the switching arms are moved to the open position.

In a particular embodiment of the invention, the measurement of the voltage of said network is obtained by filtering the voltage of said network with a predetermined time constant.

In a particular embodiment of the invention, the activation step is repeated at least until the voltage measured by the voltage measurement device is less than a second predetermined value.

In a particular embodiment of the invention, said activation step is repeated for a predetermined time period.

In a particular embodiment of the invention, all the phase windings of the stator are short-circuited during the short-circuiting step, and, following the short-circuiting step, the activation step is carried out for all the switching arms.

Correspondingly, the aim of the invention, according to a second aspect, is a control system for a multi-phase rotary electric machine operating as a generator and connected to an electrical network by a first and a second power supply terminal, said electrical network particularly being a network on board a motor vehicle, said control system comprising:

a control bridge comprising a plurality of parallel mounted switching arms, with each arm comprising a high-side switch and a low-side switch connected together at a center tap, which is connected to a phase winding of said rotary electric machine, said control bridge being capable of supplying said electrical network with voltage;

a control circuit capable of opening or closing the switches of the control bridge;

a device for measuring the voltage between the first and the second power supply terminal;

the control system is characterized in that, for at least one predetermined phase winding that is also connected to a predetermined switching arm, the control system further comprises a device for measuring the current passing through the predetermined phase winding and, when the voltage measured by the voltage measurement device exceeds a first value:

the control circuit closes the low-side switch of the predetermined switching arm;

the current measurement device measures the current passing through the predetermined phase;

if the intensity of the measured current is positive, the control circuit closes the high-side switch of the predetermined switching arm;

otherwise, the control circuit opens the high-side switch of the predetermined switching arm.

In a particular embodiment of the invention, if the intensity of the measured current is positive, the control circuit opens the low-side switch of said predetermined switching arm.

In a particular embodiment of the invention, if the intensity of the measured current is not positive, the control circuit closes the low-side switch of said predetermined switching arm.

In a particular embodiment of the invention, the control circuit closes the low-side switch of the predetermined switching arm and opens the high-side switch of the predetermined switching arm.

In a particular embodiment of the invention, the control circuit closes the low-side switch of the predetermined switching arm and short-circuits said at least one predetermined phase winding of the stator.

In a particular embodiment of the invention, the control circuit closes the low-side switch of the predetermined switching arm, short-circuits said at least one predetermined phase winding of the stator and the high-side switch of said predetermined switching arm is moved to the open position before the low-side switch of said predetermined switching arm is moved to the closed position.

In a particular embodiment of the invention, the control circuit closes the low-side switch of the predetermined switching arm, short-circuits all the phase windings of the stator and all the high-side switches of all the switching arms of the control bridge are moved to the open position before all the low-side switches of all the switching arms are moved to the closed position.

In a particular embodiment of the invention, following a detection indicating that the voltage measured by the voltage measurement device exceeds a first predetermined value and does so in an iterative manner for a predetermined period or as long as the voltage measured by the voltage measurement device exceeds a second predetermined value:

the control circuit closes the low-side switch of the predetermined switching arm;

the current measurement device measures the current passing through the predetermined phase;

if the intensity of the measured current is positive, the control circuit closes the high-side switch of the predetermined switching arm;

otherwise, the control circuit opens the high-side switch of the predetermined switching arm.

In a particular embodiment of the invention, following a detection indicating that the voltage measured by the voltage measurement device exceeds a first predetermined value and following the short-circuiting of the predetermined phase winding, the control system, in an iterative manner for a predetermined period or as long as the voltage measured by the voltage measurement device exceeds a second predetermined value:

the current measurement device measures the current passing through the predetermined phase;

if the intensity of the measured current is positive, the control circuit opens the low-side switch of the predetermined switching arm and closes the high-side switch of the predetermined switching arm;

otherwise, the control circuit opens the high-side switch of the predetermined switching arm and closes the low-side switch of the predetermined switching arm.

In a particular embodiment of the invention, following a detection indicating that the voltage measured by the voltage measurement device exceeds a first predetermined value and does so repeatedly for a predetermined period or as long as the voltage measured by the voltage measurement device exceeds a second predetermined value:

the current measurement device measures the current passing through the predetermined phase;

if the intensity of the measured current is positive, the control circuit opens the low-side switch of the predetermined switching arm and closes the high-side switch of the predetermined switching arm;

otherwise, the control circuit opens the high-side switch of the predetermined switching arm and closes the low-side switch of the predetermined switching arm.

In a particular embodiment of the invention, the control system is characterized in that it further comprises, for each phase, a device for measuring the current passing through this phase, and in that, for each phase:

the control circuit closes the low-side switch of the switching arm connected to this phase by its center tap;

the current measurement device measures the current passing through this phase;

if the intensity of the current measured in this phase is positive, the control circuit closes the high-side switch of the switching arm connected to this phase by its center tap;

otherwise, the control circuit opens the high-side switch of the switching arm connected to this phase by its center tap.

The control system benefits from the same previously cited advantages as the control method.

A further aim of the invention, according to a third aspect, is an electrical system comprising a control system according to the second aspect of the invention and a multi-phase and coiled rotor rotary electric machine controlled by said control system.

The electrical system benefits from the same previously cited advantages as the control method and the control system.

A further aim of the invention, according to a fourth aspect, is a control system for a multi-phase rotary electric machine operating as a generator and connected to an electrical network by a first and a second power supply terminal, said electrical network particularly being a network on board a motor vehicle, said control system comprising:
- a control bridge comprising a plurality of parallel mounted switching arms, with each arm comprising a high-side switch and a low-side switch connected together at a center tap, which is connected to a phase winding of said rotary electric machine, said control bridge being capable of supplying said electrical network with voltage;
- a control circuit capable of opening or closing the switches of the control bridge;
- a device for measuring the voltage between the first and the second supply terminal;
- the control system is characterized in that, for at least one predetermined phase winding that is also connected to a predetermined switching arm, the control system further comprises a device for measuring the current passing through the predetermined phase winding and, when the voltage measured by the voltage measurement device exceeds a first value:
    - the control circuit opens the high-side switch of the predetermined switching arm and short-circuits said at least one predetermined phase winding; then
    - the current measurement device measures the current passing through the predetermined phase;
    - if the intensity of the measured current is positive, the control circuit opens the low-side switch of the predetermined switching arm and closes the high-side switch of the predetermined switching arm;
    - otherwise, the control circuit opens the high-side switch of the predetermined switching arm and closes the low-side switch of the predetermined switching arm.

In a particular embodiment of the invention, following the short-circuiting of said at least one predetermined phase winding and following a detection indicating that the voltage measured by the voltage measurement device exceeds a first predetermined value and does so in an iterative manner for a predetermined period or as long as the voltage measured by the voltage measurement device exceeds a second predetermined value:
- the current measurement device measures the current passing through the predetermined phase;
- if the intensity of the measured current is positive, the control circuit closes the high-side switch of the predetermined switching arm;
- otherwise, the control circuit opens the high-side switch of the predetermined switching arm.

In a particular embodiment of the invention, following the short-circuiting of said at least one predetermined phase winding and following a detection indicating that the voltage measured by the voltage measurement device exceeds a first predetermined value and does so in an iterative manner for a predetermined period or as long as the voltage measured by the voltage measurement device exceeds a second predetermined value:
- the current measurement device measures the current passing through the predetermined phase;
- if the intensity of the measured current is positive, the control circuit opens the low-side switch of the predetermined switching arm and closes the high-side switch of the predetermined switching arm;
- otherwise, the control circuit opens the high-side switch of the predetermined switching arm and closes the low-side switch of the predetermined switching arm.

A further aim of the invention, according to a fifth aspect, is an electrical system comprising a control system according to the second aspect of the invention and a multi-phase and coiled rotor rotary electric machine controlled by said control system.

It is also possible to contemplate, in other embodiments, that the control method, the control system and the electrical system according to the invention have all or some of the aforementioned features in combination.

BRIEF DESCRIPTION OF THE DRAWINGS

Particular features and advantages of the present invention will become apparent from the detailed description, which is provided with reference to the figures, in which:

FIG. 1 shows a first embodiment of an electrical system according to the invention;

FIG. 2 shows, as a flow chart, a control method according to a particular embodiment of the invention;

FIG. 3 shows, in the form of a graph, the relationship between the current measured in a short-circuited phase and the status of the high-side switch of the switching arm associated with this phase.

FIG. 1 shows a first embodiment of an electrical system 100 according to the invention. This electrical system is intended, for example, to be used in a motor vehicle.

The electrical system 100 is connected to an on-board network 1 of a motor vehicle comprising at least one direct voltage source 102. The direct voltage source 102 comprises a positive terminal and a negative terminal, with said negative terminal generally being connected to an electrical ground GND, such as a chassis of the motor vehicle. The direct voltage source 102 is designed to supply a direct input voltage E between these terminals.

The electrical system 100 firstly comprises a multi-phase rotary electric machine 106. In the example described herein, the multi-phase rotary electric machine 106 comprises stator phases U, V, W including, in the described example, first respective ends that are connected to a neutral point N. In the described example, the electric machine 106 is a three-phase electric machine. The electric machine 106 is, for example, a synchronous electric machine coupled to a starter-alternator belt in order to drive this belt when operating as a motor and in order to be driven by the belt when operating as a generator.

The electrical system 100 further comprises a control system 101 according to the invention, which system comprises:

a) a control bridge 108 connected, on the one hand, to the terminals of the direct voltage source 102 and, on the other hand, to the electric machine 106 in order to supply the stator phases U, V, W of the electric machine 106 from the direct voltage source 102. The control bridge 108 thus comprises a high terminal $BH_{OS}$ and a low terminal $BB_{OS}$ that are respectively connected to the positive and negative terminals of the direct voltage source 102. The control bridge 108 is intended to receive or to supply a stator current $i_E$ from the high terminal $BH_{OS}$;

b) an electronic control circuit 120;

c) a device 130 for measuring the voltage between the high terminal $BH_{OS}$ and the low terminal $BB_{OS}$;

d) a measurement device 140$_U$ for measuring the intensity of the current $I_u$ circulating in the stator phase U;

e) a measurement device 140$_V$ for measuring the intensity of the current $I_v$ circulating in the stator phase V; and f) a measurement device 140$_W$ for measuring the intensity of the current $I_w$ circulating in the stator phase W.

The control bridge 108 further comprises arms that are respectively associated with the stator phases U, V, W. Each arm comprises a high-side switch connected to the high terminal $BH_{OS}$ and a low-side switch connected to the low terminal $BB_{OS}$. The high-side switch and the low-side switch are also connected together at a center tap ($P_U$, $P_V$, $P_W$) that is connected to the associated stator phase U, V, W. Each arm is intended to be controlled so as to switch between two configurations. In the first configuration, called high-side configuration, the high-side switch is closed and the low-side switch is open, such that the input voltage E is applied to a second end of the associated stator phase U, V, W. In the second configuration, called low-side configuration, the high-side switch is open and the low-side switch is closed, such that a zero voltage is applied to the second end of the associated stator phase U, V, W. The control bridge 108 is controlled by the electronic control circuit 120 so as to switch each arm between these two configurations, so as to regulate the currents passing through the stator phases U, V, W.

In the embodiment described herein, the high-side and low-side switches of the control bridge 108 are isolated gate field effect transistors, more commonly known as MOSFETs (Metal Oxide Semiconductor Field Effect Transistor).

The device 140$_U$ for measuring the current circulating in the stator phase U of the electric machine 106 measures the current circulating from the center tap $P_U$ to the neutral point N. By convention, this current is positive when the current enters the stator phase U from the center tap $P_U$, and is negative otherwise.

Similarly, the device 140$_V$ for measuring the current circulating in the stator phase V of the electric machine 106 measures the current circulating from the center tap $P_V$ to the neutral point N. By convention, this current is positive when the current enters the stator phase V from the center tap $P_V$, and is negative otherwise.

Similarly, the device 140$_W$ for measuring the current circulating in the stator phase W of the electric machine 106 measures the current circulating from the center tap $P_W$ to the neutral point N. By convention, this current is positive when the current enters the stator phase W from the center tap $P_W$, and is negative otherwise.

The electrical system 100 further comprises a capacitor 104 connected between the terminals $BH_{OS}$, $BB_{OS}$ of the control bridge 108. The capacitor 104 comprises, for example, one or more capacitors, for example, chemical capacitors.

With reference to [FIG. 2], the main steps of a control method according to the invention implemented by the control system 101 when the rotary electric machine 106 is in its generator operating mode will now be described.

Initially (step D), the rotary electric machine 106 is in generator mode.

The electronic control circuit 120 alternately controls, during a step E100, the opening and the closing of the low-side and high-side switches of the control bridge 108 in an operating mode known as synchronous rectifier mode.

At the same time, during a step E200, the voltage measurement device 130 measures the voltage V* between the high $BH_{OS}$ and the low $BH_{OS}$ terminals and sends this measured voltage to the control circuit 120. The voltage V* is obtained, for example, by filtering the voltage between the high $BH_{OS}$ and the low $BH_{OS}$ terminals in order to avoid any current ripples resulting from the rectification, and in order to avoid the false detection of load losses.

During a step E300, the measured voltage V* is compared to a first predetermined value VS1, for example, of 58 V, by the control circuit 120.

If the measured voltage V* is below the first predetermined value VS1, no load loss is detected, and the control system repeats the parallel steps E100 and E200.

If the measured voltage V* is above the first predetermined value VS1, an overvoltage on the on-board network 1, which is due, for example, to the disconnection of the direct voltage source 102, is detected and the electronic control circuit 120, during a step E400, short-circuits the stator phases U, V and W of the rotary electric machine 106.

The short-circuit is implemented by commanding the closure of all the low-side switches of the switching arms of the control bridge 108. In other words, all the switching arms of the control bridge 108 are in their low configuration.

Then, during a step E500, the measurement device 140$_U$ measures the current $I_u$ circulating in the stator phase U.

During a step E600, the measured current $I_u$ is compared to the zero value by the control circuit 120.

If the current $I_u$ is positive, during a step E800, the electronic control circuit commands the closure of the high-side switch and the opening of the low-side switch of the switching arm associated with the stator phase U.

Otherwise, ($I_u$ is negative or zero), during a step E700, the electronic control circuit commands the opening of the high-side switch and the closing of the low-side switch of the switching arm associated with the stator phase U.

At the same time as steps E500, E600, E700, E800, the method, in the embodiment described herein, carries out steps E510, E610, E710, E810, E910.

During step E510, the measurement device 140$_V$ measures the current $I_V$ circulating in the stator phase V.

During step E610, the measured current $I_V$ is compared to the zero value by the control circuit 120.

If the current $I_V$ is positive, during step E810, the electronic control circuit commands the closure of the high-side switch and the opening of the low-side switch of the switching arm associated with the stator phase V.

Otherwise, ($I_V$ is negative or zero), during step E710, the electronic control circuit commands the opening of the high-side switch and the closure of the low-side switch of the switching arm associated with the stator phase V.

At the same time as steps E500, E600, E700, E800 and E510, E610, E710, E810, the method, in the embodiment described herein, carries out steps E520, E620, E720, E820, E920.

During step E520, the measurement device 140$_W$ measures the current $I_W$ circulating in the stator phase W.

During step E620, the measured current $I_W$ is compared to the zero value by the control circuit 120.

If the current $I_W$ is positive, during step E820, the electronic control circuit commands the closure of the high-side switch and the opening of the low-side switch of the switching arm associated with the stator phase W.

Otherwise, ($I_W$ is negative or zero), during step E720, the electronic control circuit commands the opening of the high-side switch and the closing of the low-side switch of the switching arm associated with the stator phase W.

After steps E700, E710, E720 or steps E800, E810, E820, the voltage measurement device 130 measures, during a step E900, the voltage V* between the high $BH_{OS}$ and the low $BH_{OS}$ terminals and sends this measured voltage to the control circuit 120.

During a step E1000, the measured voltage V* is compared to a second predetermined value VS2, for example, of 54 V, by the control circuit 120.

If the measured voltage V* is above the second predetermined value VS2, the control system repeats the parallel steps E500-E800, E510-E810, E520-E820 and E900.

If the measured voltage V* is below the second predetermined value VS2, the control method stops (step F).

FIG. 3 shows a graph of the evolution of the current $I_u$ measured in the winding of the phase U and specifies the period during which the high-side switch of the switching arm associated with the stator phase U is closed.

In the preceding embodiment of the control method according to the invention, steps E500-E800, E510-E810, E520-E820 and E900 are carried out periodically, as long as the measured voltage V* is above the second predetermined value VS2. In an alternative embodiment, steps E500-E800, E510-E810, E520-E820 and E900 are carried out periodically during a predetermined time interval DT, for example, of 40 ms.

In the preceding embodiment of the control method according to the invention, steps E500-E800, E510-E810, E520-E820 are carried out at the same time for all the phases of the stator. As an alternative embodiment, only steps E500-E800 are carried out. In other words, in this alternative embodiment, only the intensity of the current $I_u$ measured in the winding of the phase U is taken into account by the control method.

Of course, the invention is not limited to the embodiments described with reference to the figures, and alternative embodiments could be contemplated without departing from the scope of the invention.

For example, in the previously described embodiments, the transistors are all MOSFET transistors. As an alternative embodiment, these transistors can be Insulated Gate Bipolar Transistors (IGBTs).

The invention claimed is:

1. A method for controlling a multi-phase rotary electric machine, the stator of which is controlled by a control bridge comprising a plurality of parallel mounted switching arms, with each arm comprising a high-side switch and a low-side switch connected together at a center tap, which is connected to a phase of said rotary electric machine, said rotary electric machine operating as a generator and being connected to an electrical network on board a motor vehicle, said method comprising:
   short-circuiting at least one phase winding of the stator when measurement of the voltage of said network exceeds a first predetermined value; and
   following the short-circuiting, activating a switching arm, the center tap of which is connected to said at least one short-circuited phase winding, during which:
      the intensity in the short-circuited winding is measured;
      if the measured intensity is positive, the high-side switch of said activated switching arm is moved to the closed position;
      otherwise, the high-side switch of said activated switching arm is moved to the open position.

2. The control method as claimed in claim 1, wherein the measurement of the voltage of said network is obtained by filtering the voltage of said network with a predetermined time constant.

3. The control method as claimed in claim 1, wherein the activation is repeated at least until the voltage measured by the voltage measurement device is less than a second predetermined value.

4. The control method as claimed in claim 1, wherein said activation step is repeated for a predetermined time period.

5. The control method as claimed in claim 1, wherein all the phase windings of the stator are short-circuited during the short-circuiting, and wherein, following the short-circuiting, the activation is carried out for all the switching arms.

6. A control system for a multi-phase rotary electric machine operating as a generator and connected to an electrical network on board a motor vehicle by a first and a second power supply terminal, said control system comprising:
   a control bridge comprising a plurality of parallel mounted switching arms, with each arm comprising a high-side switch and a low-side switch connected together at a center tap, which is connected to a phase winding of said rotary electric machine, said control bridge being capable of supplying said electrical network with voltage;
   a control circuit for opening or closing the switches of the control bridge;
   a device for measuring the voltage between the first and the second power supply terminal;
   wherein for at least one predetermined phase winding that is also connected to a predetermined switching arm, the control system further comprises a device for measuring the current passing through the predetermined phase winding and, when the voltage measured by the voltage measurement device exceeds a first value:
      the control circuit closes the low-side switch of the predetermined switching arm;
      the current measurement device measures the current passing through the predetermined phase;
      if the intensity of the measured current is positive, the control circuit closes the high-side switch of the predetermined switching arm
      otherwise, the control circuit opens the high-side switch of the predetermined switching arm.

7. The control system as claimed in claim 6, wherein, following a detection indicating that the voltage measured by the voltage measurement device exceeds a first predetermined value and does so in an iterative manner for a predetermined period or as long as the voltage measured by the voltage measurement device exceeds a second predetermined value:
   the control circuit closes the low-side switch of the predetermined switching arm;
   the current measurement device measures the current passing through the predetermined phase;
   if the intensity of the measured current is positive, the control circuit closes the high-side switch of the predetermined switching arm;
   otherwise, the control circuit opens the high-side switch of the predetermined switching arm.

8. The control system as claimed in claim 6 further comprising, for each phase, a device for measuring the current passing through this phase, and in that, for each phase:
   the control circuit closes the low-side switch of the switching arm connected to this phase by its center tap;
   the current measurement device measures the current passing through this phase;

if the intensity of the current measured in this phase is positive, the control circuit closes the high-side switch of the switching arm connected to this phase by its center tap;

otherwise, the control circuit opens the high-side switch of the switching arm connected to this phase by its center tap.

9. An electrical system comprising a control system as claimed in claim 6; and a multi-phase and coiled rotor rotary electric machine controlled by said control system.

* * * * *